(12) United States Patent
Suzuki et al.

(10) Patent No.: US 11,099,322 B2
(45) Date of Patent: Aug. 24, 2021

(54) OPTICAL FIBER

(71) Applicant: SUMITOMO ELECTRIC INDUSTRIES, LTD., Osaka (JP)

(72) Inventors: Masato Suzuki, Osaka (JP); Yuki Kawaguchi, Osaka (JP); Yoshinori Yamamoto, Osaka (JP); Takemi Hasegawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/004,767

(22) Filed: Aug. 27, 2020

(65) Prior Publication Data
US 2020/0393614 A1 Dec. 17, 2020

Related U.S. Application Data

(63) Continuation of application No. PCT/JP2019/007356, filed on Feb. 26, 2019.

(30) Foreign Application Priority Data

Mar. 7, 2018 (JP) .............................. JP2018-040665

(51) Int. Cl.
*G02B 6/02* (2006.01)
*G02B 6/036* (2006.01)

(52) U.S. Cl.
CPC ..... *G02B 6/03627* (2013.01); *G02B 6/02004* (2013.01); *G02B 6/02395* (2013.01); *G02B 6/03644* (2013.01)

(58) Field of Classification Search
CPC ............ G02B 6/02004; G02B 6/02395; G02B 6/03622; G02B 6/03627; G02B 6/03644
See application file for complete search history.

(56) References Cited

U.S. PATENT DOCUMENTS

| | | | |
|---|---|---|---|
| 7,764,854 B2 * | 7/2010 | Fini ..................... | G02B 6/03605 385/123 |
| 7,783,149 B2 * | 8/2010 | Fini ..................... | G02B 6/02009 385/123 |

(Continued)

FOREIGN PATENT DOCUMENTS

| | | |
|---|---|---|
| JP | 2003-531799 A | 10/2003 |
| JP | 2013-035722 A | 2/2013 |

(Continued)

OTHER PUBLICATIONS

Morgan, R., et al., "Wavelength dependence of bending loss in monomode optical fibers: effect of the fiber buffer coating," Opt. Lett., vol. 15, No. 17, 1990, p. 947-p. 949.

*Primary Examiner* — Ryan A Lepisto
(74) *Attorney, Agent, or Firm* — Faegre Drinker Biddle & Reath LLP

(57) ABSTRACT

An optical fiber according to an embodiment includes: a core; an inner cladding surrounding the core and having a refractive index smaller than a refractive index of the core; an outer cladding surrounding the inner cladding and having a smaller refractive index than the refractive index of the core and having a refractive index greater than the refractive index of the inner cladding, in which a ratio of a caustic radius to a MAC-value (caustic radius/MAC-value) at a bending radius of 10 mm at a wavelength of 1625 nm is 2.70 µm or more.

15 Claims, 11 Drawing Sheets

(56) References Cited

U.S. PATENT DOCUMENTS

| | | | | |
|---|---|---|---|---|
| 7,924,500 B1* | 4/2011 | Minelly | ................. | G02B 6/023 |
| | | | | 359/341.1 |
| 8,442,078 B1 | 5/2013 | Stolyarov et al. | | |
| 9,158,066 B2* | 10/2015 | Fini | ........................ | G02B 6/028 |
| 9,207,395 B2* | 12/2015 | Fini | ..................... | G02B 6/0283 |
| 9,291,771 B2* | 3/2016 | Kawaguchi | ........ | G02B 6/03627 |
| 9,322,989 B2* | 4/2016 | Fini | ................... | G02B 6/02009 |
| 9,507,084 B2* | 11/2016 | Fini | ................... | G02B 6/02019 |
| 2009/0041415 A1* | 2/2009 | Tanobe | .............. | G02B 6/03605 |
| | | | | 385/127 |
| 2014/0161406 A1 | 6/2014 | Kumano | | |
| 2015/0226915 A1 | 8/2015 | Kawaguchi et al. | | |
| 2016/0109651 A1 | 4/2016 | Borel et al. | | |
| 2017/0075061 A1 | 3/2017 | Bookbinder et al. | | |
| 2020/0292750 A1* | 9/2020 | Suzuki | ............... | G02B 6/02009 |

FOREIGN PATENT DOCUMENTS

| | | |
|---|---|---|
| JP | 2014-526066 A | 10/2014 |
| JP | 2015-505068 A | 2/2015 |
| JP | 2015-166853 A | 9/2015 |
| JP | 2016-081067 A | 9/2015 |
| JP | 2016-522440 A | 7/2016 |
| WO | WO-01/083624 A2 | 11/2001 |
| WO | WO-2013/028513 A1 | 2/2013 |
| WO | WO-2013/090759 A1 | 6/2013 |
| WO | WO-2014/179404 A1 | 11/2014 |

* cited by examiner

Fig.8

| ITEM | BENDING LOSS (R=10mm, λ=1625nm) | MFD (1.31μm) | λc | MAC-VALUE | b | b/a | ZERO-DISPERSION WAVELENGTH | λcc | Rc (R=10mm, λ=1625nm) | Rc,eff (R=10mm, λ=1625nm) | CORE RADIUS a | AVERAGE RELATIVE REFRACTIVE INDEX OF CORE Δcore | AVERAGE REFRACTIVE INDEX OF INNER CLADDING Δdep | Δcore - Δdep |
|---|---|---|---|---|---|---|---|---|---|---|---|---|---|---|
| UNIT | dB/turn | μm | nm | DIMENSIONLESS | μm | DIMENSIONLESS | nm | nm | μm | μm | μm | % | % | % |
| EXAMPLE 1 | 0.12 | 8.70 | 1271 | 6.84 | 19.9 | 4.91 | 1309 | 1218 | 19.39 | 2.83 | 4.06 | 0.33 | -0.086 | 0.42 |
| EXAMPLE 2 | 0.13 | 8.72 | 1289 | 6.77 | 20.6 | 5.49 | 1315 | 1236 | 19.74 | 2.92 | 3.75 | 0.34 | -0.076 | 0.41 |
| EXAMPLE 3 | 0.10 | 8.40 | 1299 | 6.47 | 19.1 | 4.81 | 1316 | 1258 | 18.61 | 2.88 | 3.98 | 0.37 | -0.053 | 0.43 |
| EXAMPLE 4 | 0.20 | 8.38 | 1260 | 6.66 | 18.6 | 4.96 | 1312 | 1225 | 18.15 | 2.73 | 3.75 | 0.37 | -0.064 | 0.44 |
| EXAMPLE 5 | 0.24 | 8.26 | 1263 | 6.55 | 18.4 | 4.90 | 1318 | 1221 | 17.72 | 2.70 | 3.75 | 0.37 | -0.054 | 0.43 |
| COMPARATIVE EXAMPLE 1 | 0.30 | 8.55 | 1208 | 6.83 | 19.3 | 5.04 | 1323 | 1169 | 16.61 | 2.43 | 3.83 | 0.39 | -0.058 | 0.45 |
| COMPARATIVE EXAMPLE 2 | 0.35 | 8.47 | 1240 | 6.83 | 19.2 | 5.46 | 1323 | 1199 | 16.37 | 2.40 | 3.52 | 0.37 | -0.049 | 0.42 |
| COMPARATIVE EXAMPLE 3 | 0.27 | 8.40 | 1277 | 6.58 | 17.8 | 4.94 | 1315 | 1235 | 17.21 | 2.62 | 3.60 | 0.37 | -0.060 | 0.43 |

Fig. 9

| ITEM | BENDING LOSS (R=15mm, λ=1625nm) | MFD (1.31μm) | λc | MAC-VALUE | b/a | ZERO-DISPERSION WAVELENGTH | λcc | Rc (R=15mm, λ=1625nm) | Rc POSITION | Rc.eff (R=15mm, λ=1625nm) | OUTER RADIUS OF INNER CLADDING b |
|---|---|---|---|---|---|---|---|---|---|---|---|
| UNIT | dB/turn | μm | nm | DIMENSIONLESS | DIMENSIONLESS | nm | nm | μm | | μm | μm |
| EXAMPLE 6 | 0.003 | 8.70 | 1271 | 6.84 | 4.91 | 1309 | 1218 | 20.87 | NONE | 3.05 | 19.916 |
| EXAMPLE 7 | 0.002 | 8.72 | 1289 | 6.77 | 5.49 | 1315 | 1236 | 21.09 | TRANSITION PORTION | 3.12 | 20.606 |
| EXAMPLE 8 | 0.007 | 8.47 | 1240 | 6.83 | 5.46 | 1323 | 1169 | 20.17 | TRANSITION PORTION | 2.95 | 19.303 |
| EXAMPLE 9 | 0.003 | 8.47 | 1240 | 6.83 | 5.46 | 1323 | 1199 | 20.25 | TRANSITION PORTION | 2.92 | 19.227 |
| EXAMPLE 10 | 0.008 | 8.40 | 1277 | 6.58 | 4.94 | 1315 | 1235 | 22.88 | OUTER CLADDING EXCLUDING TRANSITION PORTION | 3.50 | 17.771 |
| EXAMPLE 11 | 0.009 | 8.30 | 1272 | 6.53 | 4.76 | 1316 | 1217 | 21.54 | OUTER CLADDING EXCLUDING TRANSITION PORTION | 3.30 | 17.848 |
| EXAMPLE 12 | 0.007 | 8.46 | 1287 | 6.57 | 4.78 | 1312 | 1241 | 22.84 | OUTER CLADDING EXCLUDING TRANSITION PORTION | 3.47 | 18.308 |
| COMPARATIVE EXAMPLE 4 | 0.011 | 8.40 | 1276 | 6.58 | 4.94 | 1315 | 1235 | 20.32 | OUTER CLADDING OTHER THAN TRANSITION PORTION | 3.08 | 17.771 |

Fig.10

|  | UNIT | PREFERABLE RANGE | MORE PREFERABLE RANGE |
|---|---|---|---|
| a | μm | 3.65~4.50 | 3.70~4.35 |
| b | μm | 15.5~22.5 | 18.0~22.0 |
| Δcore | % | 0.32~0.40 | 0.34~0.38 |
| Δdep | % | -0.030~-0.110 | -0.040~-0.090 |
| Δcore-Δdep | % | 0.36~0.46 | 0.40~0.46 |

OPTICAL FIBER

CROSS-REFERENCE TO RELATED APPLICATIONS

This application is a continuation application of PCT/JP2019/007356 claiming the benefit of priority of the Japanese Patent Application No. 2018-040665 filed on Mar. 7, 2018, the entire contents of which are incorporated herein by reference.

TECHNICAL FIELD

The present disclosure relates to an optical fiber.

This application is based upon and claims the benefit of priority from Japanese application No. 2018-040665, filed on Mar. 7, 2018, the entire contents of which is incorporated herein by reference.

BACKGROUND ART

In addition to in optical components and optical modules using optical fibers, optical fibers bent with a small radius are often installed particularly in the access system in optical fiber networks. When an optical fiber is bent, bending loss occurs in an optical signal transmitted by the optical fiber. This leads to a demand for an optical fiber having a low bending loss. Bending loss is the loss caused by bending an optical fiber at a certain radius.

CITATION LIST

Patent Literature

Patent Document 1: Japanese Patent Application Laid-Open No. 2015-166853

Non-Patent Literature

Non-Patent Document 1: R. Morgan, et al., "Wavelength dependence of bending loss in monomode optical fibers: effect of the fiber buffer coating," Opt. Lett., Vol. 15, No. 17, pp. 947-949 (1990).

SUMMARY OF INVENTION

An optical fiber according to the present disclosure includes a core, an inner cladding surrounding the core, and an outer cladding surrounding the inner cladding. The inner cladding has a refractive index smaller than that of the core. The outer cladding has a refractive index smaller than that of the core and greater than that of the inner cladding. In particular, in the optical fiber, the ratio of a caustic radius to a MAC-value at a bending radius of 10 mm at a wavelength of 1625 nm (caustic radius/MAC-value) is 2.70 μm or more.

BRIEF DESCRIPTION OF DRAWINGS

FIG. 8 is a table summarizing specifications of optical fibers of Examples and Comparative examples (Part 1).

FIG. 9 is a table summarizing specifications of optical fibers of Examples and Comparative examples (Part 2).

FIG. 10 is a table summarizing preferable ranges and more preferable ranges of each of parameters of an optical fiber.

DESCRIPTION OF EMBODIMENTS

Figure 1:
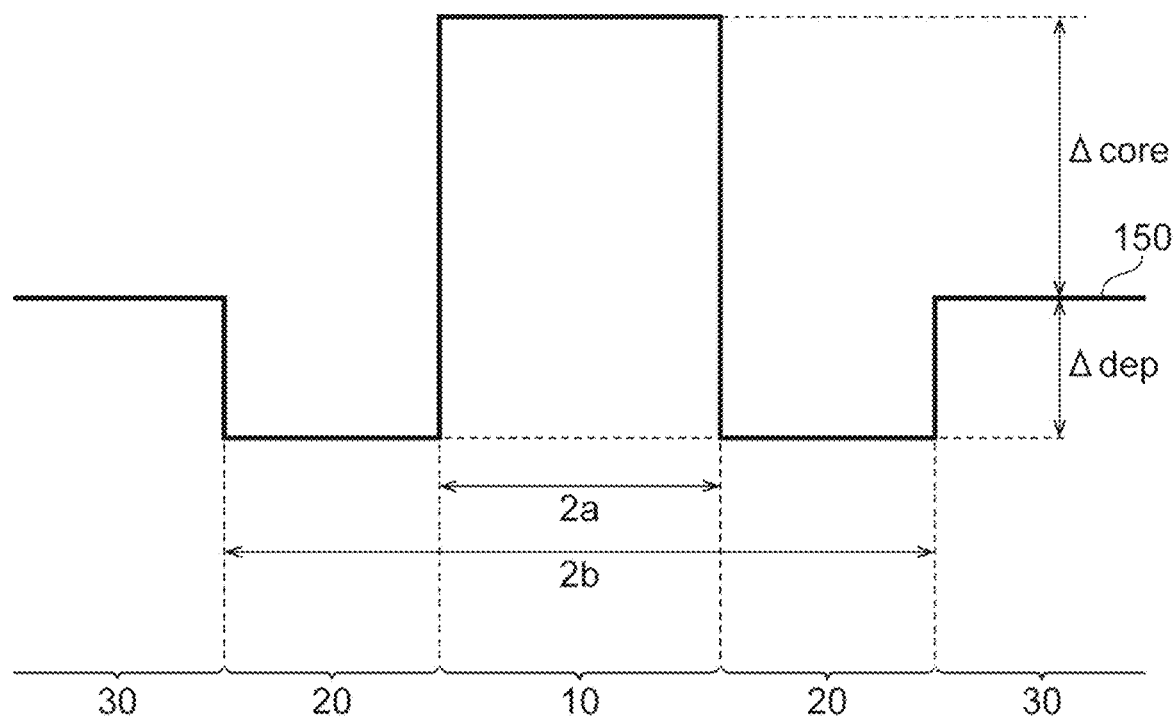
FIG. 1 is a diagram illustrating an example of a refractive index profile of an optical fiber.

A parameter called a caustic radius is important in the examination of the bending loss of an optical fiber. The caustic radius will be described with reference to FIGS. 1 and 2. FIG. 1 is a diagram illustrating an example of a refractive index profile of an optical fiber. This optical fiber has a W-shaped refractive index profile 150. That is, this optical fiber includes a core 10, an inner cladding 20 surrounding the core 10, and an outer cladding 30 surrounding the inner cladding 20. The inner cladding 20 has a refractive index smaller than that of the core 10. The outer cladding 30 has a refractive index smaller than that of the core 10 and greater than that of the inner cladding 20.

Figure 2:
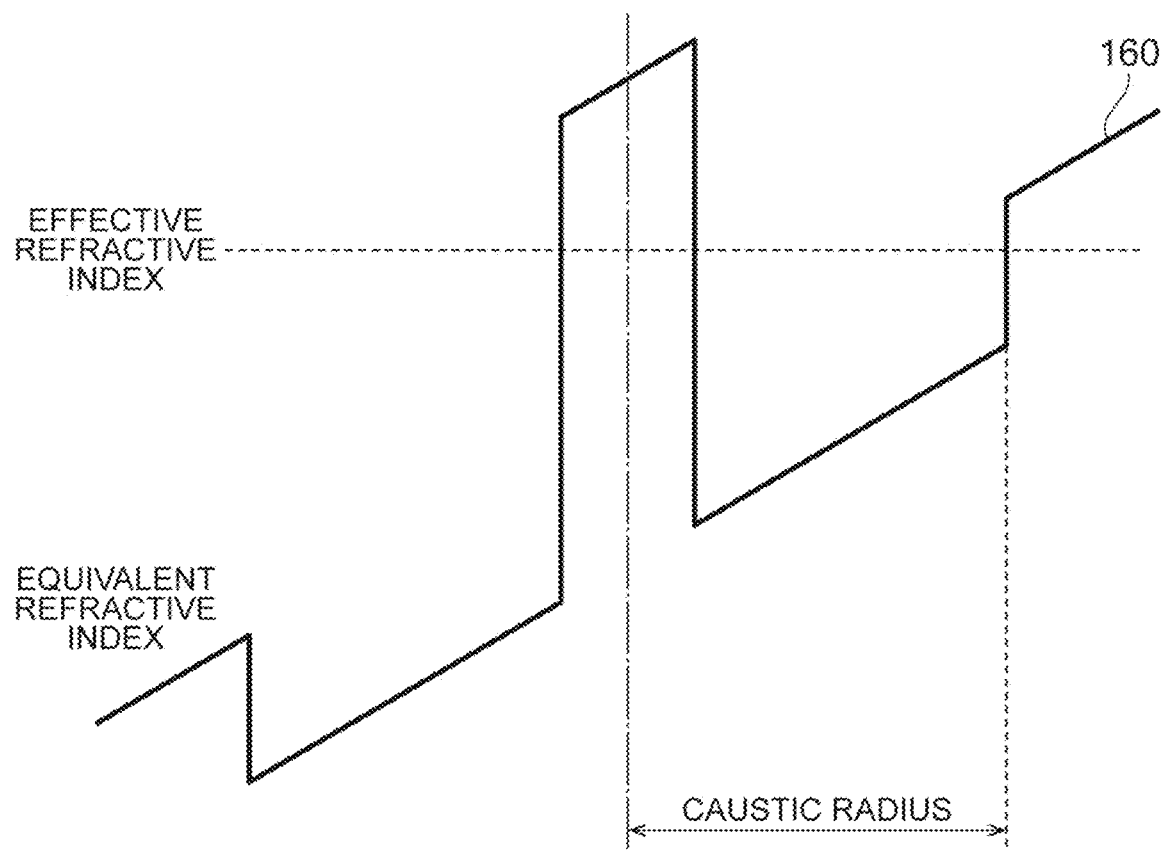
FIG. 2 is a diagram illustrating an equivalent refractive index profile of an optical fiber that is bent at a certain radius.

FIG. 2 is a diagram illustrating an equivalent refractive index profile 160 for handling an optical fiber bent at a certain radius as a linear waveguide. When the optical fiber is bent, the propagation distance of light is longer on the outside of the bend of the optical fiber than on the inside of the bend. Therefore, as illustrated in FIG. 2, the equivalent refractive index profile has a high refractive index at each of portions located outside the bend, while having a low refractive index at each of portions located inside the bend. The refractive index calculated in consideration of the change in the refractive index due to the bend is referred to as an equivalent refractive index. In FIG. 2, the level of the effective refractive index of the LP01 mode at a certain wavelength λ is also illustrated by a broken line. The caustic radius is defined as a distance from a center position in the cross section of an optical fiber (corresponding to a center O in the fiber cross section illustrated in FIG. 3A) to a position where the equivalent refractive index and the effective refractive index are equal to each other in an equivalent refractive index profile 160 in a radial direction of the optical fiber parallel to the bending direction of the optical fiber that is bent at a certain radius.

Here, an effective refractive index $n_{\mathit{eff}}(\lambda)$ of the LP01 mode at a wavelength λ is defined as a value obtained by dividing a propagation constant of the LP01 mode at the wavelength λ when the optical fiber is not bent by the wavenumber at the wavelength λ. When the refractive index profile on the fiber cross section at the wavelength λ is n(λ, r) and the bending radius is R [mm], an equivalent refractive index profile $n_{bend}(R, \lambda, r, \theta)$ of the optical fiber is defined by the following Formula (1). Note that FIG. 3A is a diagram illustrating each of parameters of the optical fiber.

$$n_{bend}(R, \lambda, r, \theta) = n(\lambda, r)\left(1 + \frac{r \cdot \cos\theta}{R}\right) \quad (1)$$

Figure 3A:
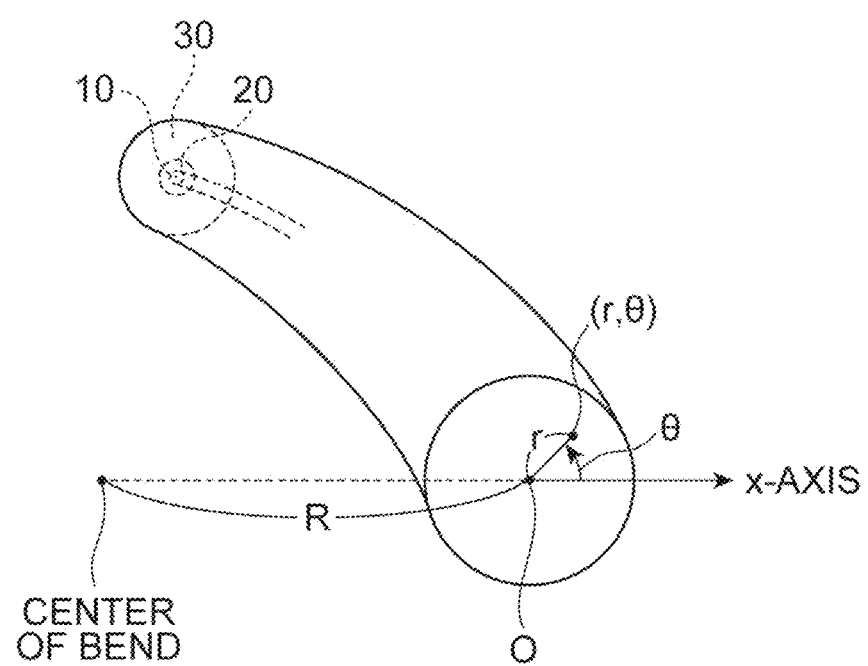
FIG. 3A is a diagram illustrating each of parameters of an optical fiber.

The distance r [mm] illustrated in FIG. 3A is a distance from the center O of the fiber cross section to a certain point. That is, the refractive index profile n(λ, r) on the fiber cross section at the wavelength λ represents a relationship between the distance r and a refractive index n (refractive index at the wavelength λ) at position away from the center O in the optical fiber cross section (fiber cross section) by the distance r. A straight line connecting the center position of the bending radius R and the center O of the fiber cross section is defined as an x-axis, the center O in the fiber cross section is defined as an origin (x=0) on the x-axis, and a direction from the center position of the bending radius R to the center O in the fiber cross section is defined as a positive direction. At this time, θ is an angle formed by a line segment connecting a certain point on the fiber cross section and the center O in the fiber cross section to each other and a half line defined by a region where x is 0 or more.

In the following, in the case where θ=0 (that is, in the region where x≥0 on the x-axis), a variable x that satisfies the following Formula (2) among the values which leads to the equivalent refractive index $n_{bend}(R, \lambda, r, 0)$ of an optical fiber equal to the effective refractive index $n_{\mathit{eff}}(\lambda)$ of the LP01 mode is defined as a caustic radius $R_c(R, \lambda)$ at the wavelength λ when the optical fiber is bent at the bending radius R. In a case where such $R_c(R, \lambda)$ exists in plurality, the smallest value among these is adopted.

$$n_{bend}(R,\lambda,0.95x<r<0.99x,0)<n_{bend}(R,\lambda,\\ 1.01x<r<1.05x,0) \quad (2)$$

Light existing outside the caustic radius in the fiber cross section is emitted to the outside of the optical fiber, leading to a bending loss (refer to Patent Document 1). That is, in order to reduce the bending loss, it is necessary to reduce the power of light existing outside the caustic radius. There are two possible approaches to the reduction of the power of light existing outside the caustic radius. The first approach is to increase the caustic radius to reduce the region of the optical fiber cross section that can perform emission in the presence of light. The second approach is to enhance the confinement of light into the core, thereby reducing the spread of the light distribution in the optical fiber cross section.

Technical Problem

The inventors found the following problems as a result of examinations on conventional optical fibers. That is, in the above-described second approach, the confinement of light into the core can be quantitatively expressed by a parameter referred to as a MAC-value. The MAC-value is a value obtained by dividing a mode field diameter (MFD) of the LP01 mode at 1310 nm by a cut-off wavelength λc. The cut-off wavelength is a fiber cut-off wavelength defined in ITU-T G.650.1. There is a correlation between the MAC-value and bending loss. Accordingly, conventional methods have concentrated on the reduction of MAC-value as a guideline for manufacturing an optical fiber having a low bending loss.

Figure 4:
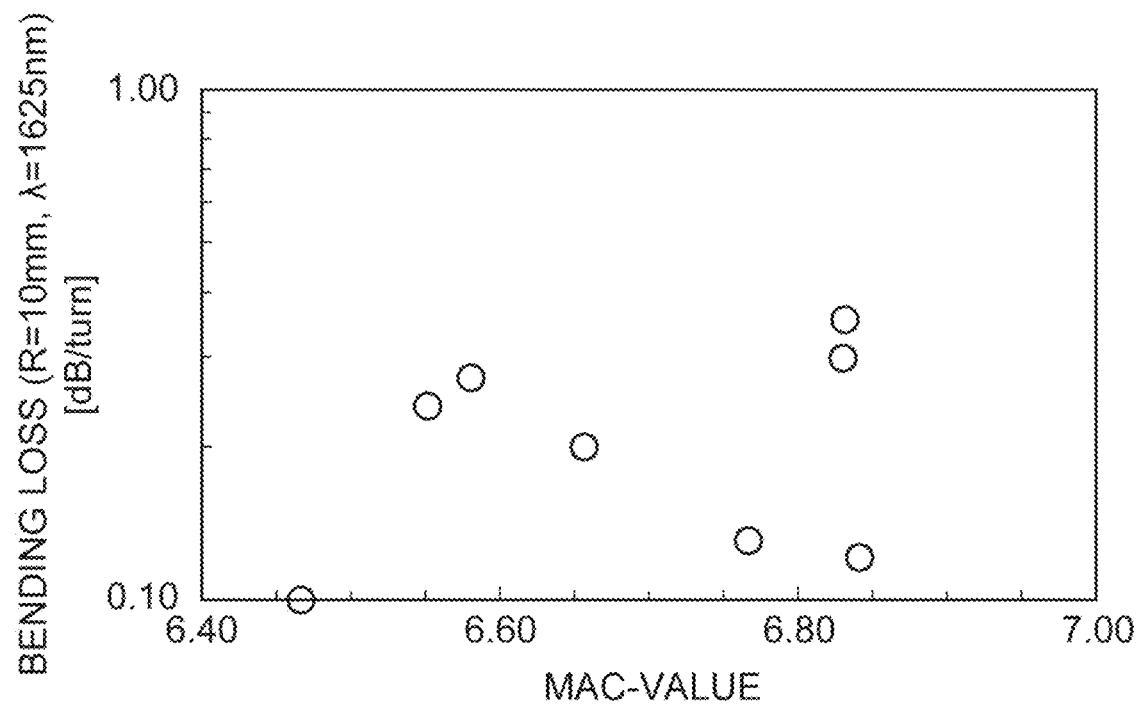
FIG. 4 is a graph illustrating a correlation between the MAC-value and bending loss.

FIG. 4 is a graph illustrating the correlation between the MAC-value and bending loss. However, as illustrated in FIG. 4, although there is a certain degree of correlation between the MAC-value and the bending loss, a variation is large. The bending loss on the vertical axis in FIG. 4 is a value for one turn at a bending radius R=10 mm at a wavelength λ=1625 nm.

Therefore, the present inventors examined the caustic radius in addition to the MAC-value as parameters for determining the bending loss. In addition, the inventors investigated the relationship between the value obtained by dividing the caustic radius by the MAC-value (hereinafter referred to as "effective caustic radius") and the bending loss in the course of the examination. As a result of repeated test production of optical fibers, the present inventors have found that the bending loss can be determined with higher accuracy by the effective caustic radius as compared with the case of using the MAC-value.

The present disclosure has been made based on the above findings, and aims to provide an optical fiber having a low bending loss.

Advantageous Effects of Invention

According to the present disclosure, it is possible to provide an optical fiber with a low bending loss.

DESCRIPTION OF EMBODIMENTS OF PRESENT DISCLOSURE

First, the specifics of the embodiments of the present disclosure will be listed and described individually.

(1) The optical fiber according to one aspect of the present disclosure includes a core, an inner cladding surrounding the core, and an outer cladding surrounding the inner cladding. The inner cladding has a refractive index smaller than that of the core. The outer cladding has a refractive index smaller than that of the core and greater than that of the inner cladding. In particular, in the optical fiber, the ratio of a caustic radius to a MAC-value at a bending radius of 10 mm at a wavelength of 1625 nm (caustic radius/MAC-value) is 2.70 μm or more.

(2) As one aspect of the present disclosure, it is preferable that the optical fiber has an MFD of 8.2 μm or more and 9.9 μm or less at a wavelength of 1310 nm. As one aspect of the present disclosure, it is preferable that an outer radius b of the inner cladding is 15.5 μm or more and 22.5 μm or less, a value $\Delta_{dep}$ obtained by subtracting a maximum relative refractive index difference of the outer cladding from an average relative refractive index difference of the inner cladding is −0.11% or more and −0.03% or less (more preferably −0.09% or more and −0.03% or less), and the MAC-value is preferably 6.26 or more and 7.56 or less. In this aspect, a ratio b/a of an outer radius b of the inner cladding to a radius a of the core would be any value as long as the value is 3.5 or more and 6.0 or less. As one aspect of the present disclosure, it is preferable that the outer radius b of the inner cladding is 18.0 μm or more and 22.0 μm or less, the value $\Delta_{dep}$ obtained by subtracting the maximum relative refractive index difference of the outer cladding from the average relative refractive index difference of the inner cladding is −0.09% or more and −0.04% or less (more preferably −0.07% or more and −0.04% or less), and the MAC-value is 6.30 or more and 7.25 or less (or 6.40 or more). In this aspect, the ratio b/a of the outer radius b of the inner cladding to the radius a of the core would be any value as long as the value is 4.5 or more and 5.5 or less. As one aspect of the present disclosure, the optical fiber preferably has a cable cut-off wavelength λcc of 1260 nm or less and a zero-dispersion wavelength of 1300 nm or more and 1324 nm or less. Here, a relative refractive index difference Δ of the refractive index n is defined by using a refractive index $n_0$ at a wavelength of 1550 nm of pure silica, as follows:

$$\Delta(n^2 n_0^2)/(2n^2)$$

(3) As one aspect of the present disclosure, the core diameter is preferably 7.3 µm or more and 9.0 µm or less, and a value $\Delta_{core}$ obtained by subtracting the maximum relative refractive index difference of the outer cladding from the average relative refractive index difference of the core is preferably 0.32% or more and 0.40% or less. As one aspect of the present disclosure, a position separated by a caustic radius at a bending radius of 15 mm at a wavelength of 1625 nm from the center of the core (center of the fiber cross section) is preferably present either in the inner cladding or in a transition portion between the inner cladding and the outer cladding. Furthermore, as one aspect of the present disclosure, a position separated from the center of the core by a caustic radius at a bending radius of 15 mm at a wavelength of 1625 nm is preferably present in the outer cladding excluding the transition portion between the inner cladding and the outer cladding. In this case, at the above-described position defined by the caustic radius, the slope of the refractive index profile defined by the relationship between the distance along a direction from the center of the core to the outer peripheral surface of the outer cladding and the refractive index, that is, the slope (dn/dr) of the refractive index profile n (λ=1625 nm, r) is preferably negative. Furthermore, as one aspect of the present disclosure, a position separated from the center of the core by a caustic radius at a bending radius of 15 mm at a wavelength of 1625 nm is preferably present in the outer cladding excluding the transition portion between the inner cladding and the outer cladding. In this case, at the above-described position defined by the caustic radius, the slope of the residual stress profile defined by the relationship between the distance along a direction from the center of the core to the outer peripheral surface of the outer cladding and the residual stress is preferably positive.

(4) As one aspect of the present disclosure, it is preferable that the residual stress at an outermost part of the outer cladding decreases from the center of the core toward the outer peripheral surface of the outer cladding. The "outermost part of the outer cladding" means a part (outer region) of the outer cladding located at an outer side with respect to a midpoint between a boundary of the inner cladding/the outer cladding and the outer peripheral surface of the outer cladding. The residual stress includes two types of stress, namely, tensile stress and compressive stress. The "decrease in residual stress" means both a decrease in an absolute value of the tensile stress and an increase in an absolute value of the compressive stress.

(5) As one aspect of the present disclosure, the optical fiber may further include a primary resin layer surrounding the outer cladding. Furthermore, as one aspect of the present disclosure, the optical fiber may further include a primary resin layer and a secondary resin layer surrounding the primary resin layer. As one aspect of the present disclosure, the primary resin layer preferably has a refractive index of 1.44 or more and 1.51 or less at a wavelength of 546 nm. As one aspect of the present disclosure, the absolute value of the refractive index difference between the primary resin layer and the secondary resin layer at a wavelength of 546 nm is preferably 0.07 or less. As one aspect of the present disclosure, it is preferable that the primary resin layer has a Young's modulus of 1 MPa or less and the secondary resin layer has a Young's modulus of 800 MPa or more.

As described above, each aspect listed in [Description of Embodiments of Present disclosure] is applicable to all of the remaining aspects or to all combinations of these remaining aspects.

Details of Embodiments of Present Disclosure

Hereinafter, a specific structure of the optical fiber according to the embodiment of the present disclosure will be described in detail with reference to the accompanying drawings. It is to be understood that the present disclosure is not limited to these examples, but is to be indicated by the scope of the claims, and it is intended to include meanings equivalent to the claims and all modifications within the scope. The same reference signs are given to same components in the description of the drawings and duplicate descriptions will be omitted.

Figure 5:
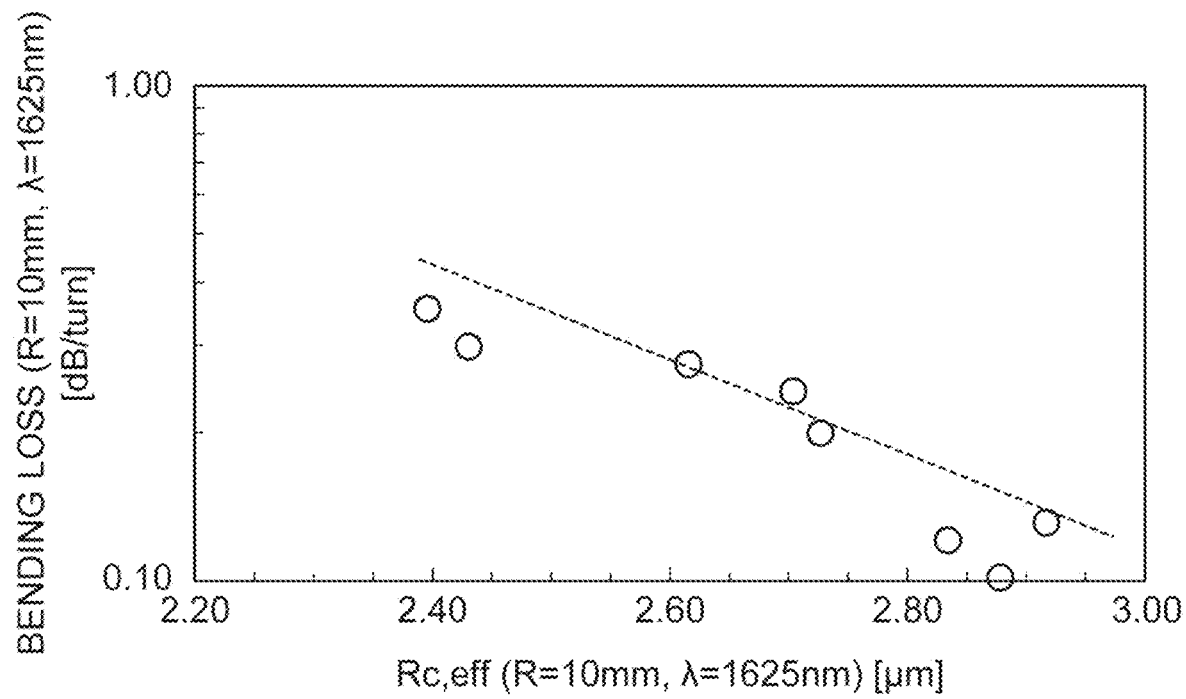
FIG. 5 is a graph illustrating a relationship between an effective caustic radius $R_{c,\mathit{eff}}$ (R=10 mm, λ=1625 nm) and a bending loss $\alpha_{1625,10}$ in an optical fiber having a W-shaped refractive index profile.

It is empirically known that one of the most stringent bending loss conditions prescribed in the ITU-T G.657.A2 standard is to achieve both wavelength λ=1625 nm and bending radius R=10 mm. FIG. 5 is a graph illustrating a relationship between the effective caustic radius $R_{c,eff}$ (R=10 mm, λ=1625 nm) and the bending loss in an optical fiber having a W-shaped refractive index profile. The bending loss on the vertical axis in FIG. 5 is a value for one turn at bending radius R=10 mm at wavelength λ=1625 nm (hereinafter, referred to as a value $\alpha_{1625,10}$). As observed from FIG. 5, the optical fiber having an effective caustic radius of 2.70 µm or more can satisfy $\alpha_{1625,10} \leq 0.2$ dB/turn, which corresponds to the standard of ITU-T G.657.A2.

Figure 3B:
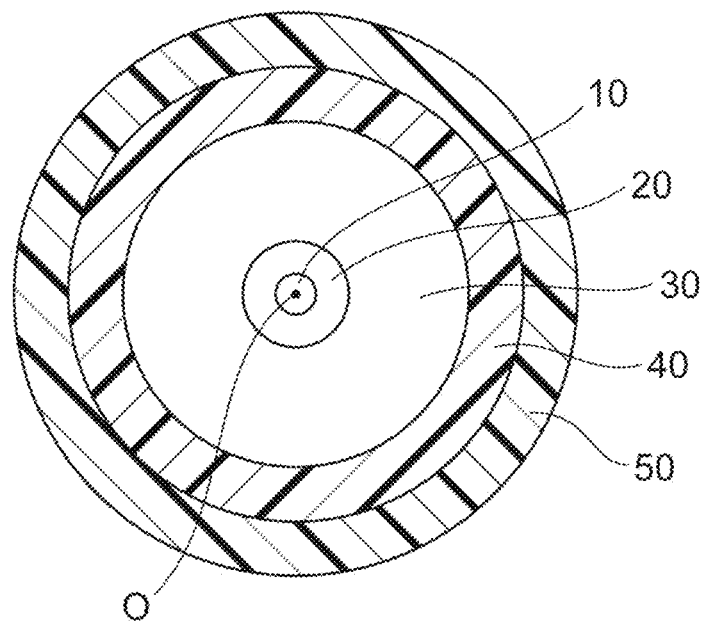
FIG. 3B is a view illustrating a cross-sectional structure of an optical fiber.

Here, the optical fiber of the present disclosure has the W-shaped refractive index profile 150 illustrated in FIG. 1. Moreover, as illustrated in FIG. 3B, the optical fiber includes, as a cross-sectional structure, the core 10 (the center of the core 10 coincides with the center O of the fiber cross section), the inner cladding 20 surrounding the core 10, and the outer cladding 30 surrounding the inner cladding 20. The inner cladding 20 has a refractive index smaller than that of the core 10. The outer cladding 30 has a refractive index smaller than that of the core 10 and greater than that of the inner cladding 20. The optical fiber further includes a primary resin layer 40 surrounding the outer cladding 30, and a secondary resin layer 50 surrounding the primary resin layer 40.

Furthermore, in an optical fiber having a W-shaped refractive index profile 150 and an effective caustic radius of 2.70 µm or more, achieving the MFD of 8.2 µm or more and 9.9 µm or less in the LP01 mode at the wavelength 1310 nm would make it possible to meet the ITU-T G657.A2 standard. Since the smaller MFD can reduce the effective caustic radius, the MFD is more preferably 8.2 µm or more and 9.6 µm or less, and still more preferably 8.2 µm or more and 9.0 µm or less. In addition, the MFD of the lower standard optical fiber represented by G.652.D is in a range 8.8 µm to 9.6 µm. From this, it is preferable that achieving the MFD of 8.4 µm or more and 9.6 µm or less is preferable because this makes it possible to suppress an increase in connection loss with the lower standard fiber. The MFD is more preferably 8.5 µm or more and 9.2 µm or less.

A sufficient condition for an optical fiber to perform single mode transmission at a wavelength of 1310 nm is to achieve 2 m cut-off wavelength being less than 1310 nm. In order to achieve the 2 m cut-off wavelength being less than 1310 nm in the MFD range of 8.2 µm to 9.9 µm, the MAC-value needs to be 6.26 or more and 7.56 or less. In order to produce an optical fiber in this MAC-value range, the ratio b/a of the outer radius b of the inner cladding to the radius a of the core is preferably 3.5 or more and 6.0 or less, and the outer radius b of the inner cladding is preferably 15.5 μm or more and 22.5 μm or less, and the value $\Delta_{dep}$ obtained by subtracting the maximum relative refractive index difference of the outer cladding from the average relative refractive index difference of the inner cladding is preferably −0.11% or more and −0.03% or less.

The radius a of the core and the outer radius b of the inner cladding are defined at the position of the maximum difference. That is, the radius a of the core is a point where the differential coefficient of the distance variable r of the refractive index n (λ=1550 nm, r) at a wavelength of 1550 nm becomes the minimum value in the range of 3 μm≤r≤6 μm. The outer radius b of the inner cladding is a point where the differential coefficient of the distance variable r of the refractive index n (λ=1550 nm, r) at the wavelength of 1550 nm becomes the maximum value in the range of 6 μm≤r.

In optical fiber production, it is important to predict the bending loss from indices such as the MAC-value. When considering that the effective caustic radius $R_{c,eff}$(R=10 mm, λ=1625 nm) (=$R_c$ (R=10 mm, λ=1625 nm)/MAC) is a function of the MAC-value, $\partial \alpha_{1625,10}$ ($R_{c,eff}$)/$\partial$MAC can be an index of the degree of change in the bending loss with respect to the change in the MAC-value. For example, this makes it possible to grasp an expected degree of fluctuation in the bending loss when the MAC has varied in the longitudinal direction of the optical fiber. When the dependence of $R_c$ on the MAC-value is negligible, $\partial \alpha_{1625,10}$ ($R_{c,eff}$)/$\partial$MAC can be calculated by the following Formula (3).

$$\frac{\partial \alpha_{1625,10}(R_{c,eff})}{\partial \text{MAC}} = -\frac{R_c}{\text{MAC}^2} \cdot \frac{\partial \alpha_{1625,10}(R_{c,eff})}{\partial R_{c,eff}} \quad (3)$$

That is, the larger the MAC-value, the smaller the fluctuation of the bending loss $\alpha_{1625,10}$ due to the variation of the MAC-values in the longitudinal direction of the optical fiber, leading to an effect of facilitating the quality control of the bending loss. The MAC-value is preferably 6.30 or more and 7.30 or less, and it is also preferable that b be 18.0 μm or more and 22.0 μm or less, b/a be 4.5 or more and 5.5 or less, and the value $\Delta_{dep}$ obtained by subtracting the maximum relative refractive index of the outer cladding from the average relative refractive index difference of the inner cladding be −0.09% or more and −0.04% or less.

Under the condition that the cable cut-off wavelength is 1260 nm or less and the LP01 mode zero-dispersion wavelength is 1300 nm or more and 1324 nm or less, it is possible to reduce communication quality deterioration due to mode dispersion and chromatic dispersion in the wavelength 1.3 μm band.

With a larger MAC-value, it would be possible to suppress the fluctuation in the bending loss $\alpha_{1625,10}$ due to the variation of the MAC-values in the longitudinal direction of the optical fiber even with the same effective caustic radius $R_{c,eff}$(R=10 mm, λ=1625 nm). However, in order to increase the MAC-value without changing the effective caustic radius, it is necessary to increase the caustic radius. One of the methods for increasing the caustic radius is to increase the core diameter to widen the average relative refractive index difference of the core with respect to the outer cladding and increase the effective refractive index of the LP01 mode. Under the condition that the core diameter (2a) is 7.3 μm or more and 9.0 μm or less, the value ($\Delta_{core}$) obtained by subtracting the maximum relative refractive index difference of the outer cladding from the average relative refractive index difference of the core is 0.32% or more and 0.40% or less, and $\Delta_{core}$−$\Delta_{dep}$ is 0.36% or more and 0.44% or less, it is possible to increase the effective refractive index (increase the caustic radius) while preventing occurrence of multimode transmission in the wavelength band of 1.3 μm. More preferably, the core diameter (2a) is 7.4 μm or more and 8.7 μm or less, $\Delta_{core}$ is 0.34% or more and 0.38% or less, and $\Delta_{core}$−$\Delta_{dep}$ is 0.40% or more and 0.44% or less.

Figure 6:
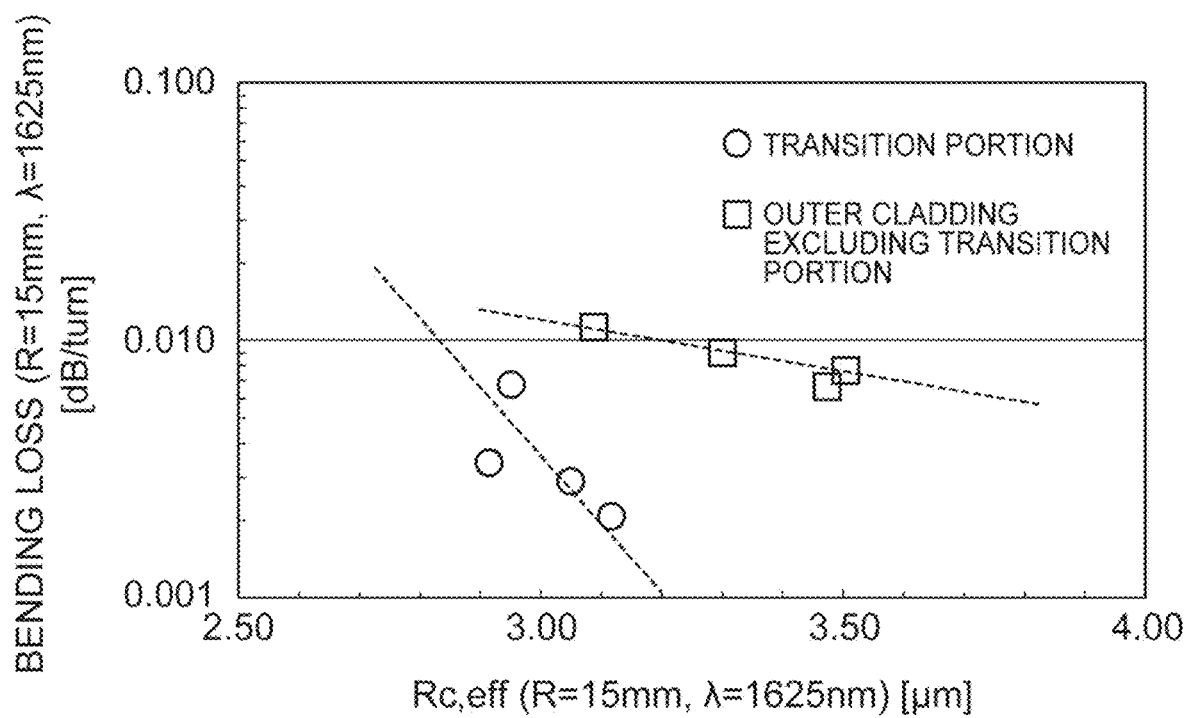
FIG. 6 is a graph illustrating a relationship between an effective caustic radius $R_{c,\mathit{eff}}$ (R=15 mm, λ=1625 nm) and a bending loss $\alpha_{1625,15}$.

The bending loss $\alpha_{1625,15}$ at a wavelength of 1625 nm at a bending radius of 15 mm is also one of the most stringent bending loss standards in the ITU-T G.657.A2 standard. FIG. 6 is a graph illustrating a relationship between the effective caustic radius $R_{c,eff}$(R=15 nm, λ=1625 nm) and the bending loss $\alpha_{1625,15}$ Bending loss $\alpha_{1625,15}$ on the vertical axis in FIG. 6 is a value for one turn at a bending radius R=15 mm at a wavelength λ=1625 nm. FIG. 6 uses different markings on the plots between the case where the caustic radius exists in the transition portion between the inner cladding 20 and the outer cladding 30 and the case where the caustic radius exists in the outer cladding 30 excluding the transition portion. The transition portion is a region where the refractive index transitions between the inner cladding 20 and the outer cladding 30 in a W-shaped refractive index profile 170 illustrated in FIG. 7. In the present specification, a section sandwiched between two points where the second derivative of the refractive index with respect to the radius is maximized and minimized, in the vicinity of the boundary between the inner cladding 20 and the outer cladding 30, is defined as the "transition portion".

Figure 7:
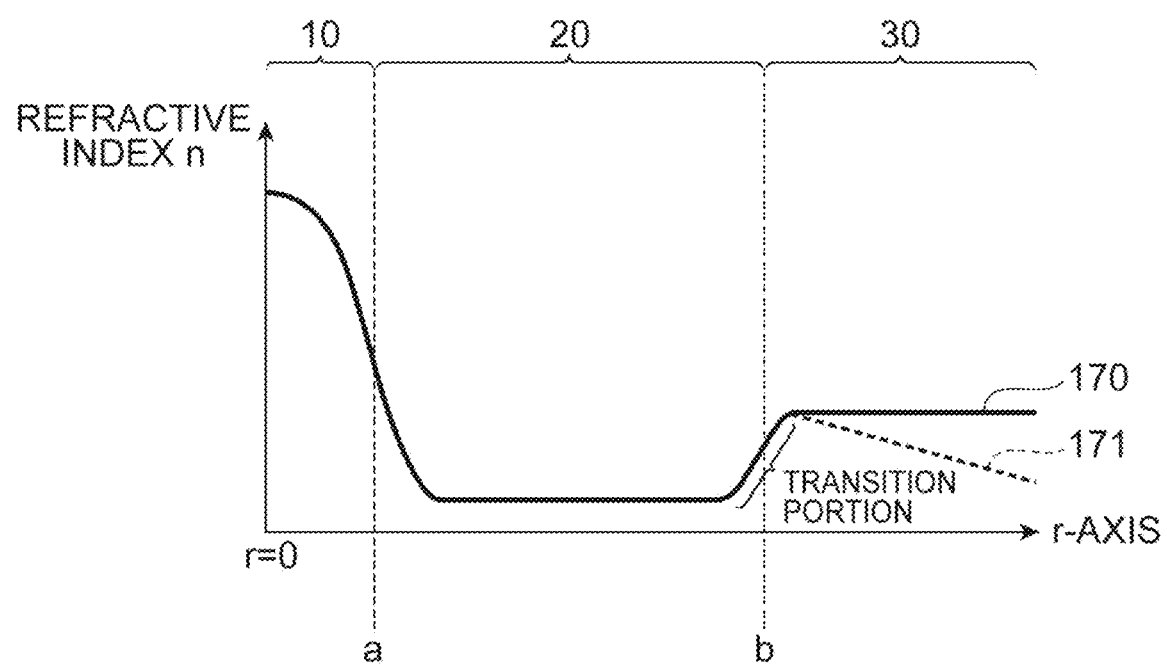
FIG. 7 is a diagram illustrating a transition portion in a W-shaped refractive index profile.

When a position defined by the caustic radius is present in the transition portion, it is possible to reduce the bending loss $\alpha_{1625,15}$ even with a small effective caustic radius $R_{c,eff}$ (R (=15 nm, λ=1625 nm), as compared with the case where the position defined by the caustic radius is present in the outer cladding 30 excluding the transition portion. From this, it is more preferable to set the position defined by the caustic radius within the transition portion. In a case where the position defined by the caustic radius is present in the outer cladding 30 excluding the transition portion, it is necessary to increase the effective caustic radius. As one of methods of increasing the effective caustic radius, it is effective to set the slope of the refractive index profile 170 to a substantially negative slope with respect to the radius in the refractive index profile 170 of the outer cladding 30 excluding the transition portion at the position specified by the caustic radius. Incidentally, the example of FIG. 7 is a case where the slope of the refractive index profile 170 of the outer cladding 30 (outer region of the outer cladding) excluding the transition portion is zero, that is, the refractive index profile 170 in the outer region of the outer cladding 30 is flat from the center of the core 10 toward the outer peripheral surface of the outer cladding 30. Therefore, as indicated by a broken line 171 in FIG. 7, by adjusting the refractive index to decrease from the center of the core 10 toward the outer peripheral surface of the outer cladding 30 in the outer region of the outer cladding 30 (region of the outer cladding excluding the transition portion), the slope of a refractive index profile 171 in the outer region of the outer cladding 30 can be set to a negative slope.

This is because, as compared with the case where the refractive index profile in the outer cladding 30 excluding the transition portion has a positive or flat slope (as indicated by the refractive index profile 170), it is possible to obtain a longer caustic radius when the refractive index profile has a substantially negative slope (as indicated by the refractive index profile 171), making it possible to contribute to the reduction of the bending loss $\alpha_{1625,15}$. In particular, when a position defined by the caustic radius is present in the outer cladding 30 excluding the transition portion, and when the slope of the residual stress profile at this position is substantially positive, it is possible, due to the photoelastic effect, to expect a negative slope in the refractive index profile of the outer cladding 30 in the neighborhood of the position defined by the caustic radius even when the refractive index profile of the outer cladding 30 excluding the transition portion at a base material stage of the optical fiber is not substantially negative. Regarding the sign of residual stress in the present specification, tensile stress is defined as positive and compressive stress is defined as negative. Therefore, the state in which the "residual stress profile has a positive slope" corresponds to one of states where the tensile stress is increasing in a direction from the center of the core 10 toward the outer peripheral surface of the outer cladding 30, where the compressive stress is transitioning to the tensile stress, or where the compressive stress is increasing.

As described in Non-Patent Document 1, there is a known phenomenon as a whispering gallery mode caused by a refractive index difference between the outer cladding 30 and the primary resin layer 40 in a configuration including: the primary resin layer 40 surrounding the outer cladding 30; and the secondary resin layer 50 surrounding the primary resin layer 40 (refer to FIG. 3B). The phenomenon of the whispering gallery mode is a phenomenon in which the light emitted by Fresnel reflection at the boundary between the outer cladding 30 and the primary resin layer 40 is again coupled to the LP01 mode. This whispering gallery mode phenomenon might worsen the bending loss, and thus it is important to suppress an increase of the refractive index difference between the outer cladding 30 and the primary resin layer 40. The absolute value of the difference between the average refractive index of the outer cladding 30 and the refractive index of the primary resin layer 40 at a wavelength of 546 nm is preferably 0.06 or less. More preferably, the value obtained by subtracting the average refractive index of the outer cladding 30 from the refractive index of the primary resin layer 40 at a wavelength of 546 nm is 0 or more and 0.04 or less.

When the residual stress is decreased to the negative side at the outermost part of the outer cladding 30, it is possible to reduce the refractive index difference between the outer cladding 30 and the primary resin layer 40 due to the photoelastic effect, as compared with the case where the residual stress is not decreased. This would be effective in reducing the amount of Fresnel reflection and suppressing the whispering gallery mode phenomenon at an interface between the outer cladding 30 and the primary resin layer 40.

Fresnel reflection also occurs at an interface between the primary resin layer 40 and the secondary resin layer 50 due to the refractive index difference between the two layers, and therefore, the whispering gallery mode phenomenon can occur near this boundary as well. Therefore, it is also desirable to have a small refractive index difference between the primary resin layer 40 and the secondary resin layer 50. The absolute value of the refractive index difference at the wavelength 546 nm between the primary resin layer 40 and the secondary resin layer 50 is preferably 0.10 or less. More preferably, the value obtained by subtracting the refractive index of the primary resin layer 40 from the refractive index of the secondary resin layer 50 at the wavelength 546 nm is 0 or more and 0.07 or less. Furthermore, by achieving a state in which the Young's modulus of the primary resin layer 40 is set to 1 MPa or less in the fiber state (state applied to the optical fiber having the cross-sectional structure as illustrated in FIG. 3B), and by achieving a state in which the Young's modulus of the secondary resin layer 50 is set to 800 MPa or more (more preferably 1000 MPa or more), it is possible to obtain an effect of suppressing the microbend loss. The microbend loss is an optical loss that occurs in an optical fiber mainly due to bending in random directions when the optical fiber is formed into a cable.

FIGS. 8 and 9 are tables summarizing the specifications of the optical fibers of Examples 1 to 12 and Comparative Examples 1 to 4. FIG. 8 illustrates specifications of the optical fibers of Examples 1 to 5 and Comparative Examples 1 to 3 at the bending radius R=10 mm. FIG. 9 illustrates specifications of the optical fibers of Examples 6 to 12 and Comparative Example 4 at the bending radius R=15 mm. FIG. 10 is a table summarizing preferable ranges and more preferable ranges of each of parameters of an optical fiber.

REFERENCE SIGNS LIST

10 . . . Core; 20 . . . Inner cladding; 30 . . . Outer cladding; 40 . . . Primary resin layer; and 50 . . . Secondary resin layer.

The invention claimed is:

1. An optical fiber comprising:
a core;
an inner cladding surrounding the core, the inner cladding having a refractive index smaller than a refractive index of the core; and
an outer cladding surrounding the inner cladding, the outer cladding having a refractive index smaller than the refractive index of the core and greater than the refractive index of the inner cladding,
wherein a ratio of a caustic radius to a MAC-value at a bending radius of 10 mm at a wavelength of 1625 nm is 2.70 µm or more.

2. The optical fiber according to claim 1, having a mode field diameter of 8.2 µm or more and 9.9 µm or less at a wavelength of 1310 nm.

3. The optical fiber according to claim 1,
wherein an outer radius b of the inner cladding is 15.5 µm or more and 22.5 µm or less,
a value $\Delta_{dep}$ obtained by subtracting a maximum relative refractive index difference of the outer cladding from an average relative refractive index difference of the inner cladding is −0.11% or more −0.03% or less, and
the MAC-value is 6.26 or more and 7.56 or less.

4. The optical fiber according to claim 1,
wherein an outer radius b of the inner cladding is 18.0 µm or more and 22.0 µm or less,
a value $\Delta_{dep}$ obtained by subtracting a maximum relative refractive index difference of the outer cladding from an average relative refractive index difference of the inner cladding is −0.09% or more and −0.04% or less, and
the MAC-value is 6.30 or more and 7.25 or less.

5. The optical fiber according to claim 1, having:
a cable cut-off wavelength of 1260 nm or less; and
a zero-dispersion wavelength of 1300 nm or more and 1324 nm or less.

6. The optical fiber according to claim 1,
wherein the core has a diameter of 7.3 µm or more and 9.0 µm or less, and
a value $\Delta_{core}$ obtained by subtracting a maximum relative refractive index difference of the outer cladding from an average relative refractive index difference of the core is 0.32% or more and 0.40% or less.

7. The optical fiber according to claim 1,
including a position separated by a caustic radius at a bending radius of 15 mm at a wavelength of 1625 nm from a center of the core either in the inner cladding or in a transition portion between the inner cladding and the outer cladding.

8. The optical fiber according to claim 1,
including a position separated by a caustic radius at a bending radius of 15 mm at a wavelength of 1625 nm from a center of the core in the outer cladding excluding a transition portion between the inner cladding and the outer cladding,
wherein a refractive index profile defined by a relationship between a distance and a refractive index has a negative slope at the position defined by the caustic radius, the distance being defined as a distance along a direction from the center of the core toward an outer peripheral surface of the outer cladding.

9. The optical fiber according to claim 1,
including a position separated by a caustic radius at a bending radius of 15 mm at a wavelength of 1625 nm from a center of the core in the outer cladding excluding a transition portion between the inner cladding and the outer cladding,
wherein a residual stress profile defined by a relationship between a distance and a residual stress has a positive slope at a position defined by the caustic radius, the distance being define as a distance along a direction from the center of the core toward an outer peripheral surface of the outer cladding.

10. The optical fiber according to claim 1,
wherein in an outermost part of the outer cladding, a residual stress decreases from a midpoint toward an outer peripheral surface of the outer cladding, the midpoint being located between a boundary of the inner cladding and the outer cladding and the outer peripheral surface of the outer cladding, the outermost part being located on an outer side with respect to the midpoint.

11. The optical fiber according to claim 1, further comprising
a primary resin layer surrounding the outer cladding.

12. The optical fiber according to claim 11,
wherein the primary resin layer has a refractive index of 1.44 or more and 1.51 or less at a wavelength of 546 nm.

13. The optical fiber according to claim 11, further comprising
a secondary resin layer surrounding the primary resin layer.

14. The optical fiber according to claim 13,
wherein an absolute value of a refractive index difference between the primary resin layer and the secondary resin layer at a wavelength of 546 nm is 0.07 or less.

15. The optical fiber according to claim 13,
wherein the primary resin layer has a Young's modulus of 1 MPa or less, and
the secondary resin layer has a Young's modulus of 800 MPa or more.

* * * * *